United States Patent [19]

Foster et al.

[11] Patent Number: 4,487,751

[45] Date of Patent: Dec. 11, 1984

[54] PROCESS FOR CALCIUM HYPOCHLORITE

[75] Inventors: Craig A. Foster; John H. Shaffer, both of Cleveland, Tenn.

[73] Assignee: Olin Corporation, Cheshire, Conn.

[21] Appl. No.: 504,704

[22] Filed: Jun. 15, 1983

[51] Int. Cl.$^3$ .............................................. C01B 11/06
[52] U.S. Cl. ................................................... 423/474
[58] Field of Search .................... 423/474; 252/187.28

[56] References Cited

U.S. PATENT DOCUMENTS

| | | | |
|---|---|---|---|
| 1,713,669 | 5/1929 | MacMullin et al. | 423/474 |
| 1,718,285 | 6/1929 | George | 423/474 |
| 2,368,042 | 1/1945 | Robson | 423/474 |
| 3,094,380 | 6/1963 | Bruce | 23/86 |
| 3,895,099 | 7/1975 | Sakowski | 423/474 |
| 3,950,499 | 4/1976 | Miyashin et al. | 423/474 |
| 4,145,306 | 3/1979 | Tatara et al. | 423/474 |
| 4,196,184 | 4/1980 | Sakowski | 423/474 |
| 4,337,236 | 6/1982 | Sakowski et al. | 423/474 |
| 4,367,209 | 1/1983 | Sakowski et al. | 423/474 |
| 4,399,117 | 8/1983 | Sakowski | 423/474 |

FOREIGN PATENT DOCUMENTS

| | | | |
|---|---|---|---|
| 56-41805 | 4/1981 | Japan | 423/474 |
| 554669 | 7/1943 | United Kingdom | 423/474 |

Primary Examiner—Gary P. Straub
Assistant Examiner—Steven Capella
Attorney, Agent, or Firm—James B. Haglind; Donald F. Clements

[57] ABSTRACT

A process for producing calcium hypochlorite comprises wetting lime with an aqueous slurry of fine basic calcium hypochlorite crystals in a mixing zone to form an aqueous lime slurry. The aqueous lime slurry is reacted with a calcium hypochlorite solution in a crystallizing zone to produce a slurry of basic calcium hypochlorite crystals. The slurry of basic calcium hypochlorite crystals is separated in a first separation means into a slurry of fine basic calcium hypochlorite crystals and a slurry of coarse basic calcium hypochlorite crystals. The slurry of fine basic calcium hypochlorite crystals is returned to said mixing zone. The slurry of coarse basic calcium hypochlorite is conveyed to a second separation means to separate coarse crystals of basic calcium hypochlorite from a calcium hypochlorite mother liquor. Coarse crystals of basic calcium hypochlorite are admixed with lime and an alkali metal hypochlorite in a third mixing zone to form a mixed alkali slurry. The mixed alkali slurry is reacted with chlorine to form a paste of calcium hypochlorite dihydrate which is separated into a cake of calcium hypochlorite dihydrate and a paste liquor. The paste liquor is fed to the crystallizing zone. The cake of calcium hypochlorite dihydrate is dried to produce granular calcium hypochlorite.

The novel process of the present invention produces crystalline basic calcium hypochlorite slurries having high filtration rates. In addition, the process provides improved crystal growth control and effectively prevents excess nucleation in the crystallization of the basic calcium hypochlorite.

17 Claims, 4 Drawing Figures

PROCESS FOR CALCIUM HYPOCHLORITE

This invention relates to the manufacture of calcium hypochlorite. More particularly, this invention relates to an improved continuous process for the manufacture of calcium hypochlorite. Calcium hypochlorite is a commercial bleaching and sanitizing agent used particularly in the disinfection of swimming pools.

Calcium hypochlorite is produced by the reaction of an aqueous slurry of a calcium compound such as lime with a chlorinating agent, for example, chlorine. The chlorination reaction is conducted until crystals of a hypochlorite product are produced. Neutral calcium hypochlorite, $Ca(OCl)_2$, is the hypochlorite product which is most commonly sold commercially. Crystals of neutral calcium hypochlorite are, however, more difficult to separate from the accompanying mother liquor than basic calcium hypochlorites such as dibasic calcium hypochlorite. Further, after separation of the crystalline hypochlorite product, it is necessary to treat the mother liquor to recover the calcium hypochlorite values or to decompose hypochlorite ions before disposal of the solution. Mother liquors recovered during the separation of neutral calcium hypochlorite crystals tend to have higher available chlorine contents than those recovered during the separation of basic calcium hypochlorite crystals.

Thus various calcium hypochlorite processes have been described in which basic calcium hypochlorites were produced to facilitate separation from mother liquor and/or to recover calcium and available chlorine values from these solutions.

The treatment of calcium hypochlorite containing mother liquors with lime to precipitate dibasic calcium hypochlorite crystals is known as described, for example, in U.S. Pat. Nos. 1,713,669; 1,718,285; and 3,094,380.

U.S. Pat. No. 1,713,669, issued to R. B. MacMullin et al, describes a process in which a lime slurry is chlorinated to precipitate calcium hypochlorite which is separated from a filtrate containing hypochlorite values. The filtrate is treated with lime to precipitate basic calcium hypochlorite which is recycled to make up additional lime slurry.

U.S. Pat. No. 1,718,285, issued to A. George, teaches a process for reacting a sodium hypochlorite solution and lime to produce neutral calcium hypochlorite crystals in a mother liquor. Following the separation of the crystalline product, the mother liquor may be treated with lime to form a basic hypochlorite which can be used to replace an equivalent amount of lime in the next cycle of the process.

Similarly, U.S. Pat. No. 3,094,380, issued to E. A. Bruce, describes the reaction of neutral calcium hypochlorite mother liquor with lime to crystallize dibasic calcium hypochlorite. A cake of dibasic calcium hypochlorite was recovered and chlorinated to produce neutral calcium hypochlorite.

The processes of U.S. Pat. Nos. 1,713,669; 1,718,285; and 3,094,380, however, have insufficient process controls necessary to produce slurries of dibasic calcium hypochlorite crystals whose filtration rates are suitable for use in a continuous commercial calcium hypochlorite process. In addition, the filtrates remaining after recovery of the dibasic crystals have undesirably high concentrations of calcium and hypochlorite ions.

In U.S. Pat. No. 3,895,099, issued July 15, 1975, to W. J. Sakowski, after removal of the calcium hypochlorite dihydrate crystals, the mother liquor remaining is treated with an alkali metal hydroxide to recover a lime slurry.

U.S. Pat. No. 4,196,184, issued Apr. 1, 1980, to W. J. Sakowski, describes a process in which the mother liquor is reacted with an alkali metal hydroxide at a pH in the range of 12.1 to 12.6 to form a mixture of crystalline hemi-basic calcium hypochlorite and lime.

While the processes of U.S. Pat. No. 3,895,099 and U.S. Pat. No. 4,196,184 recover calcium values from calcium hypochlorite-containing liquors, both processes require evaporation of the filtrate remaining after separation of the lime.

Japanese patent No. 56-41805, issued April 18, 1981, to T. Murakami et al teaches a process in which hemibasic calcium hypochlorite is produced by the chlorination of a slurry of lime and/or dibasic calcium hypochlorite. The slurry of hemibasic calcium hypochlorite is separated from fines and impurities in a superdecanter, settler, liquid cyclone, etc. The mother liquor recovered may be treated with lime to form dibasic calcium hypochlorite and recover hypochlorite values. Any dibasic calcium hypochlorite recovered is chlorinated to produce hemibasic calcium hypochlorite. The process of this patent, however, lacks controls for crystal growth.

There is presently a need to improve the recovery of calcium and available chlorine values in calcium hypochlorite processes by increasing process controls and production rates while reducing material and energy costs.

It is an object of the present invention to provide an improved process for the production of basic calcium hypochlorites.

Another object of the present invention is to provide a process for the production of calcium hypochlorite having reduced material and energy costs.

A further object of the present invention is to provide a process for the production of basic calcium hypochlorites having improved separation and production rates.

An additional object of the present invention is to provide a process for the production of basic calcium hypochlorite having improved crystallization.

These and other objects of the invention are accomplished in a process for producing basic calcium hypochlorite which comprises:
 (a) wetting lime with an aqueous slurry of fine basic calcium hypochlorite crystals in a mixing zone to form an aqueous lime slurry;
 (b) reacting the aqueous lime slurry with a calcium hypochlorite solution in a crystallizing zone to produce a slurry of basic calcium hypochlorite crystals;
 (c) separating the slurry of basic calcium hypochlorite crystals in a first separation means into a slurry of fine basic calcium hypochlorite crystals and a slurry of coarse basic calcium hypochlorite crystals;
 (d) returning the slurry of fine basic calcium hypochlorite crystals to the mixing zone;
 (e) conveying the slurry of coarse basic calcium hypochlorite to a second separation means to separate coarse crystals of basic calcium hypochlorite from a calcium hypochlorite mother liquor; and (f) recovering the coarse crystals of basic calcium hypochlorite.

Figure 1:
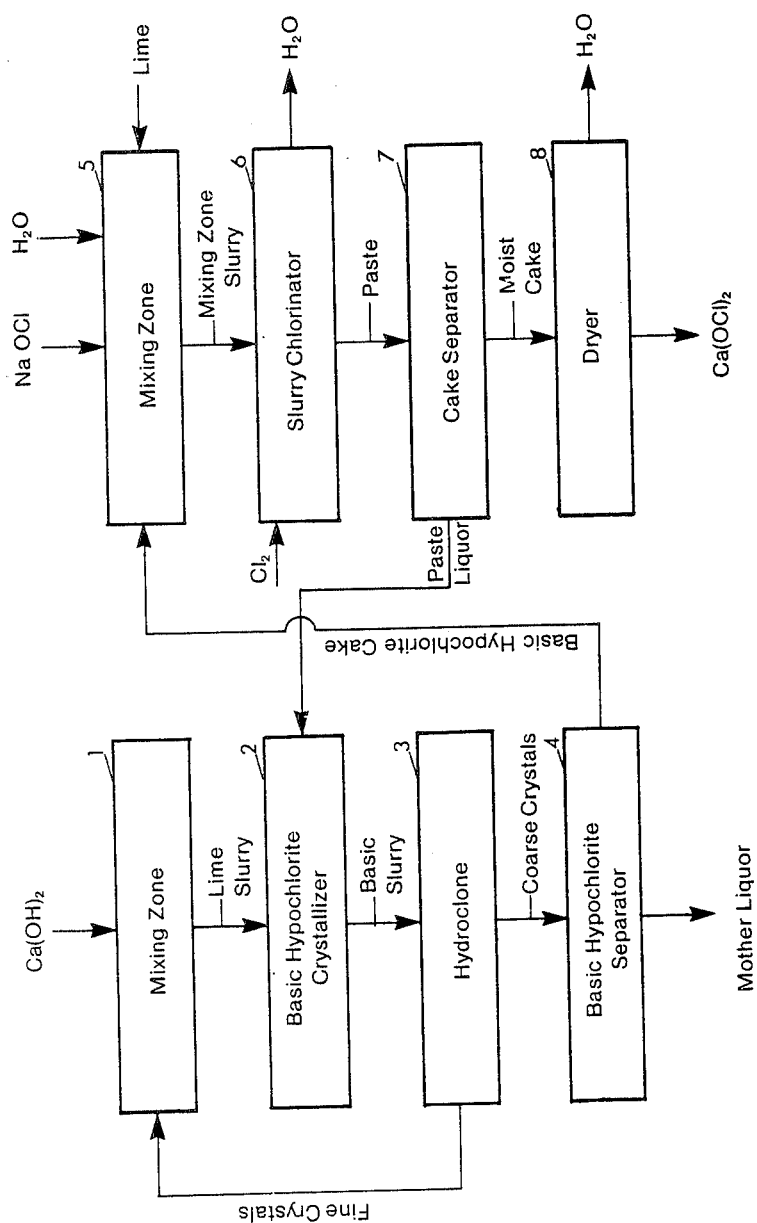
FIG. 1 is a flow sheet of one embodiment of the process of the present invention illustrating improved crystallization of basic calcium hypochlorite.

More in detail, in the process of FIG. 1, lime and a slurry of fine crystals of a basic calcium hypochlorite are admixed in mixing zone 1 to form a lime slurry. Mixing zone 1 is a mixing tank or other suitable vessel having agitation means for blending the components fed thereto. The lime slurry formed in mixing zone 1 is conveyed to basic hypochlorite crystallizer 2. Also fed to basic hypochlorite crystallizer 2 is an aqueous solution of calcium hypochlorite which reacts with lime to produce dibasic calcium hypochlorite in accordance with equation (1):

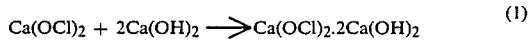

$$Ca(OCl)_2 + 2Ca(OH)_2 \longrightarrow Ca(OCl)_2 \cdot 2Ca(OH)_2 \qquad (1)$$

or hemibasic calcium hypochlorite, in accordance with Equation (2):

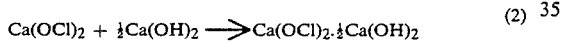

$$Ca(OCl)_2 + \tfrac{1}{2}Ca(OH)_2 \longrightarrow Ca(OCl)_2 \cdot \tfrac{1}{2}Ca(OH)_2 \qquad (2)$$

Either reaction in basic hypochlorite crystallizer 2 forms a slurry of basic calcium hypochlorite crystals. The resulting slurry is conveyed to hydroclone 3 which separates a slurry of fine basic calcium hypochlorite crystals from a slurry of coarse basic calcum hypochlorite crystals. The slurry of fine basic calcium hypochlorite crystals is recovered as the overflow and conveyed to mixing zone 1 to be admixed with lime as discussed above.

The slurry of coarse basic calcium hypochlorite recovered as the underflow in hydroclone 3 is conveyed to basic hypochlorite separator 4 which is a solid-liquid separating apparatus such as a filter. In basic hypochlorite separator 4, a moist cake of basic calcium hypochlorite is separated from a mother liquor. The mother liquor is an aqueous solution of sodium chloride which contains minor amounts of calcium hypochlorite, for example, from about 3 to about 4 weight percent of Ca(OCl)$_2$. The mother liquor may be utilized as a bleach liquor or may be recycled to the process as described more fully below.

Basic calcium hypochlorite cake, lime and sodium hypochlorite are admixed in mixing zone 5 to form a mixing zone slurry. Mixing zone 5 is a mixing tank or other suitable vessel having agitation means for blending the various components fed thereto.

The resulting mixing zone slurry is conveyed to slurry chlorinator 6 and reacted with chlorine. Slurry chlorinator 6 is any suitable chlorination apparatus provided with agitation means for maximum contact between chlorine and slurry. It is preferred to employ as slurry chlorinator 6 an evaporator chlorinator which utilizes the chlorination technique described in U.S. Pat. No. 3,241,912, issued to Bernard H. Nicolaisen on Mar. 22, 1966. The temperature within slurry chlorinator 6 is maintained within the range from about 0° to about 35° C. and preferably from about 20° to about 30° C.

During chlorination of the slurry in slurry chlorinator 6, lime, whether combined in the basic hypochlorite salt or uncombined, reacts with chlorine to form calcium hypochlorite dihydrate and calcium chloride in accordance with Equation (3):

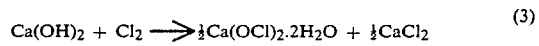

$$Ca(OH)_2 + Cl_2 \longrightarrow \tfrac{1}{2}Ca(OCl)_2 \cdot 2H_2O + \tfrac{1}{2}CaCl_2 \qquad (3)$$

Sodium hypochlorite present in slurry chlorinator 6 reacts with calcium chloride to form additional calcium hypochlorite and sodium chloride in accordance with Equation (4):

$$2NaOCl + CaCl_2 \longrightarrow Ca(OCl)_2 + 2NaCl \qquad (4)$$

The primary products of slurry chlorinator 6 are neutral calcium hypochlorite, sodium chloride and water. At start-up of the process, it is preferred to fill slurry chlorinator 6 with a slurry or "paste" of calcium hypochlorite solids suspended in an aqueous solution of sodium chloride and calcium hypochlorite, with an excess of lime or other alkali concentration in the slurry being less than about 1.0 and preferably less than about 0.50 percent by weight. The rate of feed of mixing zone slurry and chlorine to slurry chlorinator 6 and the rate of evaporation of water, if any, are adjusted to maintain the concentration of unreacted lime or other alkali during the reaction below about 1.0 percent. Continuous chlorination of the slurry in this manner causes the formation of coarse calcium hypochlorite crystals which are much more easily separated from paste liquor in cake separator 7 than are calcium hypochlorite crystals separated in a conventional triple salt process or a batch type process.

A portion of the resulting paste produced in slurry chlorinator 6 comprised of solid neutral calcium hypochlorite dihydrate and a paste liquor, which is predominately an aqueous solution of sodium chloride and calcium hypochlorite, is continuously withdrawn from slurry chlorinator 6 and conveyed to cake separator 7.

Cake separator 7 is a filter, centrifuge, or other suitable solid-liquid separating apparatus capable of separating a moist cake of calcium hypochlorite dihydrate crystals from the paste liquor.

Moist cake from cake separator 7 generally contains from about 40 to about 60 percent by weight of calcium hypochlorite dihydrate, from about 2 to about 15 percent by weight of sodium chloride, and from about 40 to about 50 percent by weight of water. Moist cake is generally conveyed to dryer 8 where it is heated to remove most of the water. Dryer 8 is any suitable drying unit or units capable of reducing the moisture content of the calcium hypochlorite cake to the desired level without causing excessive decomposition of the calcium hypochlorite particles.

Figure 2:
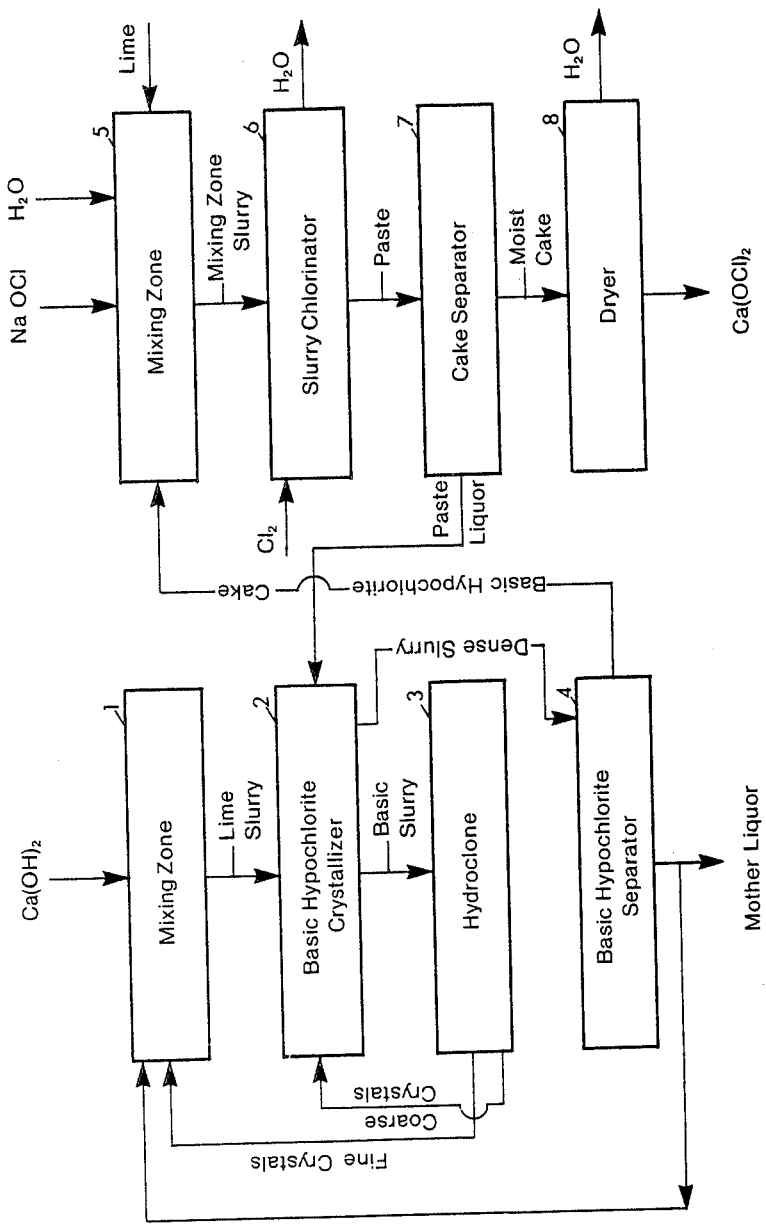
FIG. 2 is a flow sheet of an additional embodiment of the process of FIG. 1.

In the embodiment in FIG. 2, the underflow with coarse crystals from hydroclone 3 is returned to basic hypochlorite crystallizer 2. A dense slurry of coarse basic calcium hypochlorite crystals containing a small portion of fine crystals is formed and conveyed from basic hypochlorite crystallizer 2 to basic hypochlorite separator 4. A portion of the mother liquor recovered from basic hypochlorite separator 4 is recycled to mixing zone 1, along with the slurry of fine crystals of basic calcium hypochlorite from hydroclone 3, to be admixed with lime.

Figure 3:
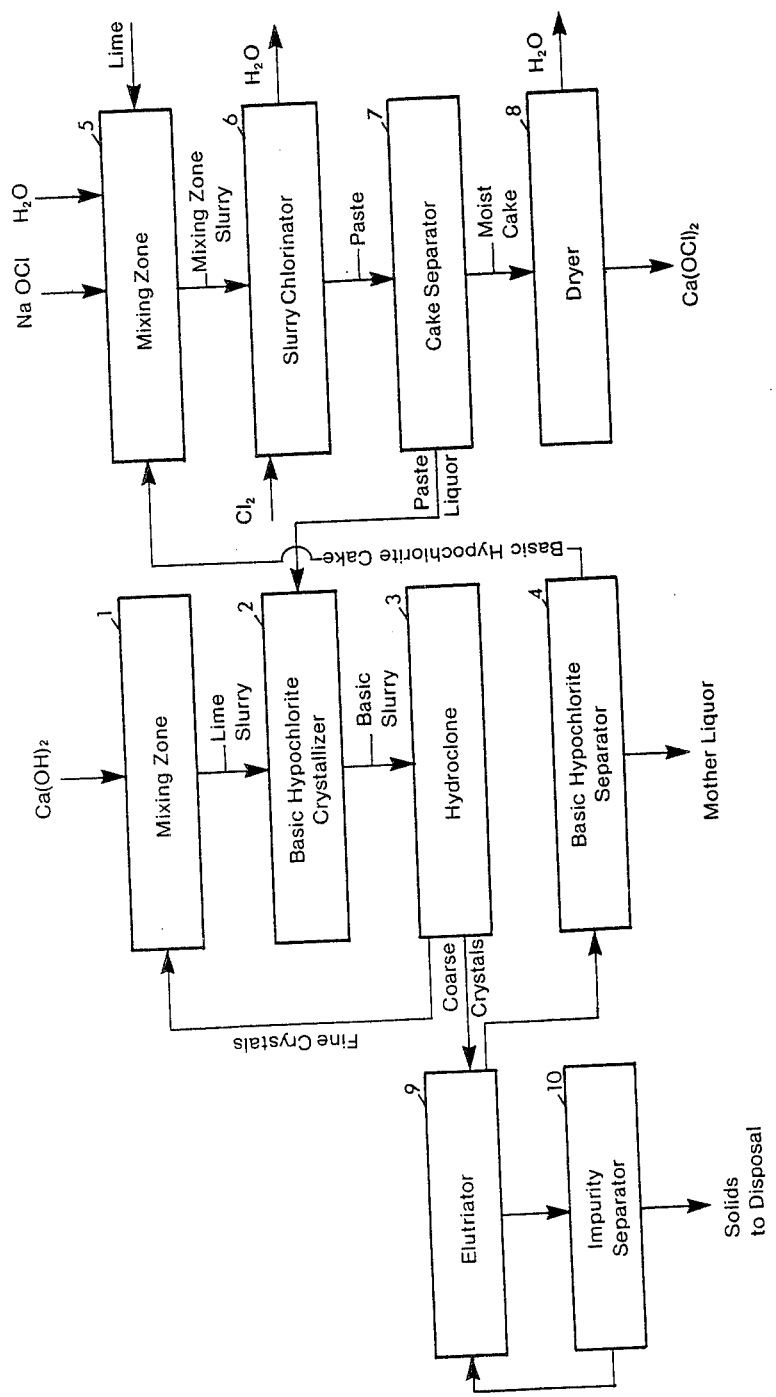
FIG. 3 is a flow sheet of one embodiment of the process of the present invention illustrating impurity separation from basic calcium hypochlorite crystals.

In the additional embodiment illustrated in FIG. 3, the slurry of coarse basic calcium hypochlorite crystals from hydroclone 3 is passed through elutriator 9 for the removal of insoluble lime impurities. This embodiment provides means for utilizing less pure limes. The elutriant is a clean filtrate produced in impurity separator 10 which discharges the insoluble impurities to solid wastes or land fill. By varying the amount of basic mother liquor in the basic hypochlorite cake or the concentration of the hypochlorite solution added to mixing zone 5, the volume of paste liquor fed from cake separator 7 to basic hypochlorite crystallizer 2 can be altered to permit a variance in the amount of raw lime fed into mixing zone 1. This permits the amount of lime purified to be modified while maintaining a fixed insoluble content in the final calcium hypochlorite product which is independent of the impurity content in the raw lime.

Figure 4:
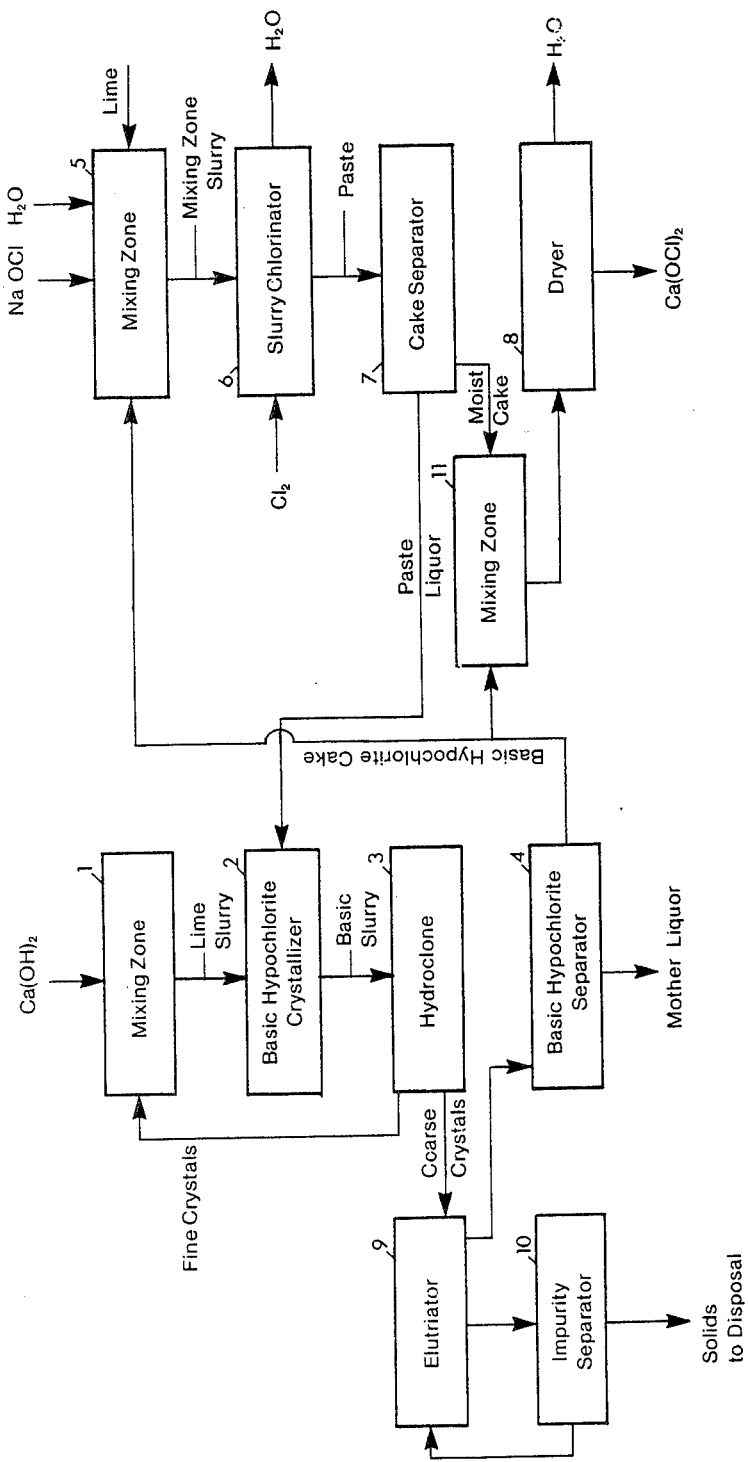
FIG. 4 is a flow sheet of the embodiment of FIG. 3 including steps for producing a stable calcium hypochlorite product having a reduced available chlorine content.

The process illustrated in FIG. 4 includes the addition of a portion of the basic calcium hypochlorite cake recovered from basic hypochlorite separator 4 to mixing zone 11. Also conveyed to mixing zone 11 is the moist cake of calcium hypochlorite dihydrate recovered from cake separator 7 or, if desired, calcium hypochlorite dihydrate paste from slurry chlorinator 6. Admixture of the basic calcium hypochlorite with the calcium hypochlorite dihydrate produces a calcium hypochlorite mixture which is conveyed to dryer 8, dried and recovered as a calcium hypochlorite product having a reduced available chlorine content, for example, from about 40 to about 65 percent.

The primary raw materials for the process of this invention are lime, an alkali metal hypochlorite such as sodium hypochlorite, chlorine and water.

Lime is added to the process at mixing zone 1 and mixing zone 5. One of the advantages of this invention is that relatively impure lime may be utilized to prepare a relatively pure calcium hypochlorite product. For example, lime having an active lime content as low as 85 percent by weight or less may be added to mixing zone 1 in accordance with the process of this invention and produce a relatively pure calcium hypochlorite product. Generally the active lime content of the lime fed to mixing zone 1 and mixing zone 5 ranges from about 85 to about 100 percent, and preferably from about 90 to about 97 percent by weight of active lime. Lime impurities of the type described above may range from about 0 to about 15 percent and generally from about 3 to about 10 percent by weight of the lime.

Typical illustrative specifications for a preferred lime feed and for an acceptable lime feed are as follows:

| Component | Preferred | Acceptable |
|---|---|---|
| $Ca(OH)_2$ min. % | 95.0 | 85 |
| $CaCO_3$ max. % | 1.0 | 3.0 |
| MgO max. % | 0.5 | 3.5 |
| $SiO_2$ max. % | 0.5 | 2.5 |
| $FeO_3 + Al_2O_3$ max. % | 0.5 | 1.5 |
| $CaSO_4$ max. % | 0.5 | 1.5 |

The average particle size of lime fed to the process generally is substantially all −325 mesh (wet screen analysis), but particles up to about −200 mesh may be employed, if desired.

When the impurity content of lime in the lime feed is greater than about 5 percent by weight, it may be desirable to employ a lime purification step, as illustrated by the processes of FIGS. 3 and 4, to remove impurities from at least a portion of the lime.

Alkali metal hypochlorites are employed as reactants in the present invention and one of the products is an alkali metal chloride. In order to simplify the disclosure, the invention will be described hereinafter in terms of "sodium hypochlorite" and "sodium chloride". However, those skilled in the art will recognize that any other suitable alkali metal hypochlorite such as potassium hypochlorite can serve as a substitute or partial replacement for the corresponding sodium compounds. In this event, one of the products will be potassium chloride. In order to simplify process conditions, it is preferred to employ either all sodium compounds or all potassium compounds. However, the process can also be operated with a mixture of these alkali metal compounds if the efficiency of separating products is not important to the operation.

Sodium hypochlorite, added to mixing zone 5, may be prepared by chlorinating an aqueous solution of sodium hydroxide in a suitable agitated chlorinator reactor (not shown). The sodium hydroxide concentration in the aqueous solution used to make sodium hypochlorite for feed to mixing zone 5 ranges from about 20 to about 75 and preferably from about 35 to about 55 percent by weight.

Chlorine is added to slurry chlorinator 6 in either gaseous or liquid form. The chlorination reaction is carried out preferably in an evaporator-type chlorinator of the type described above.

The basic calcium hypochlorite produced in the novel process of the present invention may be dibasic calcium hypochlorite or hemibasic calcium hypochlorite. To simplify the following portions of the disclosure, the process will be described in terms of dibasic calcium hypochlorite, the preferred embodiment of basic calcium hypochlorite.

In preparing the lime slurry in mixing zone 1, dry lime is added to the slurry of fine dibasic calcium hypochlorite crystals recovered as the overflow from hydroclone 3. The lime slurry prepared preferably contains from about 10 to about 20 percent by weight of $Ca(OH)_2$, and more preferably from about 12 to about 15 percent by weight of $Ca(OH)_2$. Concentrations of $Ca(OH)_2$ higher than about 20 percent may be used, however, this may result in excessive crystal nucleation which is undesirable. At concentrations lower than about 10 percent by weight of $Ca(OH)_2$, additional reactor volume may be required to maintain the desired residence reaction time. Fine crystals present in the lime slurry formed serve as a seed bed for basic hypochlorite crystallizer 2 and prevent the formation of excessive nucleation sites in the crystallizer. The addition of fine crystals to the lime slurry results in the production of dibasic calcium hypochlorite crystals having an increased average crystal size and also improved control of the range of dibasic calcium hypochlorite crystal sizes produced. The production of both very fine crystals and very large crystals is reduced.

Paste liquor from cake separator 7 generally has a sodium chloride concentration ranging from about 15 to about 22 percent, and preferably from about 17 to about 20 percent by weight; a calcium hypochlorite concentration ranging from about 7 to about 15 percent and preferably from about 8 to about 12 percent by weight; and a water content ranging from about 60 to about 75 percent, and preferably from about 68 to about 73 percent by weight.

As discussed above, paste liquor is reacted with a lime slurry in basic hypochlorite crystallizer 2 to produce dibasic calcium hypochlorite crystals. To produce crystals having improved filterability while recovering substantial amounts of the calcium hypochlorite values in the paste filtrate, the reaction in basic hypochlorite crystallizer 2 is carefully controlled with respect to the concentration of available chlorine and the total alkalinity.

To maintain the desired available chlorine concentration in the dibasic mother liquor, basic hypochlorite crystallizer 2 is operated to maintain the oxidation-reduction potential of the dibasic calcium hypochlorite slurry in the range of from about 690 to about 705 millivolts at temperatures of 30° to 50° C. Where the oxidation-reduction potential of the reaction mixture is above about 705 millivolts the calcium hypochlorite concentration of the mother liquor recovered from dibasic separator 4 is undesirably high. At oxidation-reduction potentials below about 690 millivolts, the separation rates of the slurry of dibasic calcium hypochlorite crystals in dibasic separator are significantly reduced.

Total alkalinity of the reaction mixture of paste liquor and lime within basic hypochlorite crystallizer 2 is maintained within the range of from about 2 to about 6, and preferably from about 3 to about 4 percent. Total alkalinity of the reaction mixture is provided by the dibasic calcium hypochlorite crystals, free lime and basic impurities present such as calcium carbonate, magnesium hydroxide, magnesium oxide, calcium oxide and the like. Where the total alkalinity is above about 6 percent, the presence of excessive amounts of free lime reduces the separation rate of the slurry in basic hypochlorite separator 4. Reduction of the total alkalinity below about 2 percent results in the formation of crystals of hemibasic calcium hypochlorite.

The temperature of the reaction mixture of paste liquor and lime in basic hypochlorite crystallizer 2 is maintained within the range of from about 30° to about 50° C., preferably at from about 35° to about 42° C., and more preferably at from about 40° to about 42° C. Operating the basic hypochlorite crystallizer within these temperature ranges results in the growth of dibasic calcium hypochlorite crystals which are readily filtered, are stable, and where the production of fine crystals is controlled. When temperatures below about 30° C. are employed in the basic hypochlorite crystallizer, the crystals grown are very fine. At temperatures above about 45° C., the crystals are readily filtered, but the rate of decomposition increases resulting in the formation of excessive amounts of calcium chlorate. The slurry of dibasic calcium hypochlorite, produced in basic hypochlorite crystallizer 2, has a solids content in the range of from about 7 to about 10 percent.

The slurry of dibasic calcium hypochlorite crystals from basic hypochlorite crystallizer 2 is fed to hydroclone 3. Hydroclone 3 is a non-rotary separator having a tangential inlet into which is fed the dibasic calcium hypochlorite slurry produced in basic hypochlorite crystallizer 2. The slurry swirls about a vortex finder to separate by centrifugal force the coarse crystals from the fine crystals, with the coarse crystals flowing down the cone section to the apex opening from which a slurry of coarse dibasic calcium hypochlorite is removed as the underflow. A slurry of fine crystals and insoluble particles present passes upwardly through the vortex finder and is removed as the overflow and conveyed to mixing zone 1.

The slurry of fine crystals of dibasic calcium hypochlorite recovered as the overflow from hydroclone 3 contains, in addition to crystals less than about 50 microns in size, particles of unreacted lime and insoluble impurities. Where low grade lime sources are employed, these lime and insoluble solid particles may be removed as shown in the novel processes illustrated in FIGS. 3 and 4, employing, for example, an elutriator or other suitable hydraulic classifiers.

While the slurry of fine crystals is admixed with lime in mixing zone 1 to provide seed crystals and reduce nucleation in the crystallizing step, a portion of the fines slurry may also be recycled to basic hypochlorite crystallizer 2, if desired.

The slurry of coarse dibasic calcium hypochlorite crystals recovered as the underflow from hydroclone 3 contains crystals at least about 95 percent of which are, in the size range of from about 50 to about 1200, and preferably from about 200 to about 1000 microns. This coarse crystal slurry is preferably conveyed to basic hypochlorite separator 4, but all or a portion of the coarse slurry recovered from hydroclone 3 may be recycled to basic hypochlorite crystallizer 2 or a holding tank to provide a more dense slurry of dibasic calcium hypochlorite crystals to be fed to basic hypochlorite separator 4.

Employment of the novel process of the present invention results in greatly improved separation rates in basic hypochlorite separator 4 and, in addition, produces a dibasic calcium hypochlorite cake which retains less mother liquor, and is therefore drier than those produced in processes of the prior art. Dibasic calcium hypochlorite cakes recovered from basic hypochlorite separator 4 have a calcium hypochlorite content in the range of from about 20 to about 45 percent by weight; a $Ca(OH)_2$ content in the range of from about 20 to about 40 percent by weight; and a liquid content of from about 15 to about 35 percent by weight, where the liquid is an aqueous solution of calcium hypochlorite and sodium chloride.

The dibasic calcium hypochlorite cake is conveyed to mixing zone 5 and admixed with additional lime and the sodium hypochlorite solution.

The ultimate water content in the mixing zone slurry is controlled by adjusting the water content of the various feed streams to mixing zone 5. For example, the water used in forming the lime slurry or added directly thereto, the water content of the sodium hypochlorite solution, and the water content of the dibasic calcium hypochlorite cake from dibasic separator 4 are controlled to obtain a mixing zone slurry of the desired concentration range.

Slurry chlorinator 6, at start-up, is preferably filled with a slurry of calcium hypochlorite solids suspended in an aqueous solution of sodium chloride. The excess lime or other alkali in the slurry is maintained below about 1.0 and preferably less than about 0.5 percent by weight of the slurry. The feed rate of mixing zone slurry and chlorine to slurry chlorinator 6 and the withdrawal rate of the resulting neutral calcium hypochlorite paste are adjusted to achieve substantially complete chlorination of the calcium values fed to slurry chlorinator 6 in the mixing zone slurry, while maintaining the total alkali concentration in slurry chlorintor 6 preferably below about 1.0 percent by weight of the slurry.

Paste from slurry chlorinator 6 is predominately a slurry of neutral calcium hypochlorite in an aqueous solution of sodium chloride and calcium hypochlorite. The paste contains neutral calcium hypochlorite dihydrate crystals in the concentration of from about 10 to about 35 and preferably from about 15 to about 30 percent by weight. These crystals are predominately rectangular platelets which are only a few microns in thickness, but have substantially equal sides ranging from about 50 to about 300 microns in length with the major portion having sides ranging from about 100 microns to about 250 microns in length. Generally, less than about 10 percent of the crystals are "twin crystals" which entrain paste liquor, and which are both difficult to separate from the paste liquor and difficult to dry. Since more than about 90 percent of the calcium hypochlorite dihydrate crystals obtained by the process of this invention may be large platelets or cohesive agglomerates, there is a minimal amount of paste liquor entrained in the crystals during the separation in cake separator 7, even when filtered on a drum filter. The crystals are easier to separate from the paste liquor in cake separator 7 and are easier to dry in dryer 8 than crystals produced by conventional calcium hypochlorite techniques. In prior art techniques, more expensive high speed titanium centrifuges are necessary to obtain crystals of equivalent purity.

Moist cake from cake separator 7 contains from about 40 to about 60 percent by weight of $Ca(OCl)_2$, from about 2 to about 15 percent by weight of NaCl, and from about 40 to about 50 percent by weight of water. This moist cake may be used directly in the treatment of water systems such as swimming pools and the like, but is generally dried and stored prior to use. The moist cake is dried by known means, for example, using a spray dryer, turbodryer or vacuum dryer where the appropriate temperature ranges are employed to reduce the water content to the desired level. In the process of the present invention, the cake is dried, for example, in a turbodryer with hot air while maintaining the product temperature in the range from about 35° to about 110° C., and preferably from about 40° to about 95° C. to give a product having a calcium hypochlorite content from about 65 to about 85, a water content below about 10 percent by weight and the bulk of the remainder being sodium chloride. The dried product is then placed in suitable containers, with or without prior size classification or other processing such as pelletizing, prior to use in water treatment or other utility.

In the process illustrated in FIG. 4, prior to drying, all or a portion of the moist cake of calcium hypochlorite dihydrate from cake separator 7 is mixed with a portion of the dibasic calcium hypochlorite cake from basic hypochlorite separator 4. The mixing is carried out using suitable agitation means to produce a calcium hypochlorite product in which the $Ca(OH)_2$ present is homogeneously dispersed. The mixture is then dried in dryer 8 to provide a stable granular calcium hypochlorite product having an available chlorine content in the range of from about 40 to about 65 percent.

Dibasic mother liquor recovered from basic hypochlorite separator 4 is an aqueous solution containing sodium chloride and small amounts of dibasic calcium hypochlorite, i.e., from about 0 to about 0.75 percent by weight of $Ca(OCl)_2.2Ca(OH)_2$. As stated above, dibasic mother liquor may be sold as bleach liquor or used in forming the lime slurries used in the process. Dibasic mother liquor may also be treated with sodium hydroxide to recover the remaining calcium values as lime. The lime produced is highly active and contains above 95% $Ca(OH)_2$. The dilute slurry of lime produced by the reaction of sodium hydroxide with dibasic mother liquor is fed to a separator to separate a lime slurry from a sodium chloride solution containing small concentrates of sodium hypochlorite. The lime slurry may be recycled to mixing zone 1 and/or mixing zone 5. Where possible, the sodium chloride solution, essentially free of calcium hypochlorite and calcium hydroxide can be fed as brine to electrolytic cells for the production of chlorine and alkali metal hydroxides. The salt solution may also be discarded, without further treatment, to water bodies without resulting in undesired pollution.

The novel process of the present invention produces crystalline dibasic calcium hypochlorite slurries having high filtration rates. The process provides improved crystal growth controls and effectively prevents excess nucleation in the crystallizer resulting in the reduction of material and energy costs.

The process of the present invention can employ low grade lime sources as insoluble impurities can be effectively isolated and removed. The process may be operated batchwise or continuously although continuous operation is preferred.

The following EXAMPLES are presented to illustrate the process of the present invention without any intention of being limited thereby. All parts and percentages are by weight unless otherwise specified.

EXAMPLE 1

Lime was continuously added to a mixing tank containing an aqueous salt solution containing fine crystals of dibasic calcium hypochlorite and a slurry containing about 12 percent by weight of $Ca(OH)_2$ was prepared. The slurry was continuously fed to a crystallizing tank along with an aqueous calcium hypochlorite solution containing about 10 percent by weight of $Ca(OCl)_2$. The temperature in the crystallizing tank was maintained at 40° C. and the reaction mixture held in crystallizing tank until dibasic calcium hypochlorite crystals in the range of from about 200 to about 1000 microns were produced as determined by microscopic examination. The slurry of dibasic calcium hypochlorite crystals was continuously removed from the crystallizer and conveyed to a dibasic separator feed tank. A portion of the slurry was passed through a hydroclone which separated by centrifugal force a slurry of coarse dibasic crystals as the underflow and a slurry of fine crystals of dibasic calcium hypochlorite as the overflow. The slurry of fine dibasic crystals was continuously returned to the lime mixing tank to be admixed with additional portions of lime. The slurry of coarse dibasic calcium hypochlorite crystals was continuously returned to a filter feed tank and admixed with dibasic slurry from the crystallizer to form a dense dibasic calcium hypochlorite slurry. This dense slurry was continuously filtered to provide a cake of dibasic calcium hypochlorite and dibasic mother liquor. Filtration of the dense dibasic calcium hypochlorite slurry was at an average rate of 230 gallons per hour per square foot of filter area and provided a cake having an average of 26 percent moisture. The dibasic calcium hypochlorite cake was continuously conveyed to a mixing tank and mixed with an aqueous solution of sodium hypochlorite containing about 32 percent by weight of NaOCl, dry lime and water, where the ratio of lime to water was 1:3 parts by weight. Following admixture of these components, the resulting slurry was conveyed to a chlorinator to which chlorine was added to produce a calcium hypochlorite dihydrate paste containing about 1 percent by weight of free alkali. Calcium hypochlorite dihydrate paste was continuously fed to a filter to separate a moist calcium hypochlorite dihydrate cake from a paste liquor. The moist cake containing about 45 percent by weight of calcium hypochlorite and about 43 percent by weight of water, with the remainder being sodium chloride, was conveyed to a dryer. The dried, granular calcium hypochlorite was recovered from the dryer to produce a producing having a calcium hypochlorite content of about 70 percent by weight and a water content of about 6 percent by weight. Paste liquor separated from the paste filter was fed to the dibasic crystallizer tank as the calcium hypochlorite solution. The continuous process was operated for about 2 weeks.

COMPARATIVE EXAMPLE A

Lime was continuously admixed with an aqueous salt solution in the mixing tank of EXAMPLE 1 to prepare a lime slurry containing 12–16 percent by weight of Ca(OH)$_2$. The lime slurry was continuously fed to the crystallizing tank of EXAMPLE 1 and admixed with the aqueous calcium hypochlorite solution employed in EXAMPLE 1 in the amounts employed in EXAMPLE 1. The slurry of dibasic calcium hypochlorite crystals continuously produced was removed and conveyed to a dibasic separator feed tank. When examined under a microscope, the average crystal size was considerably smaller and the number of fine crystals produced was increased significantly. The slurry was conveyed from the dibasic separator feed tank directly to the dibasic separator used in EXAMPLE 1. Filtration of the slurry was at an average rate of 70 gallons per hour, per square foot of filter area to produce a dibasic cake having an average moisture content of 33 percent. The cake of dibasic calcium hypochlorite recovered from the separator was treated in the identical manner as that of the cake of dibasic calcium hypochlorite in EXAMPLE 1 to produce a dried granular calcium hypochlorite composition having a weight percent of Ca(OCl)$_2$ of about 70 and a weight percent of moisture of about 6.

The novel continuous process of EXAMPLE 1, employing separation and recycle of crystals, produced dibasic calcium hypochlorite crystals having a well defined crystal size range. These crystals filtered very well at a rapid rate to produce a dry cake of dibasic calcium hypochlorite.

In the comparative example, however, the presence of large numbers of fine crystals drastically reduced the filtration rate of the dibasic slurry to less than $\frac{1}{3}$ of the rate of EXAMPLE 1. The dibasic calcium hypochlorite cake produced had a much higher moisture content (7% by weight) than the cake of EXAMPLE 1.

EXAMPLE 2

Equal amounts by weight of dibasic calcium hypochlorite crystals and calcium hypochlorite dihydrate paste were added to a mixing tank. The components were carefully blended to disperse the dibasic crystals homogeneously throughout the mixture. The calcium hypochlorite blend was filtered and the filter cake dried to produce a granular calcium hypochlorite product having an available chlorine content of 51%. The dried product was stored at 100° F. for a period of ninety days. Ca(OCl)$_2$ content was determined and found to be 42 percent, indicating a stable calcium hypochlorite product.

What is claimed is:
1. A process for producing basic calcium hypochlorite which comprises:
   (a) wetting lime with an aqueous slurry of fine basic calcium hypochlorite crystals in a mixing zone to form an aqueous lime slurry;
   (b) reacting said aqueous lime slurry with a calcium hypochlorite solution in a crystallizing zone to produce a slurry of basic calcium hypochlorite crystals;
   (c) separating said slurry of basic calcium hypochlorite crystals in a first separation means into a slurry of fine basic calcium hypochlorite crystals and a slurry of coarse basic calcium hypochlorite crystals, said fine basic calcium hypochlorite crystals being less than about 50 microns in size;
   (d) returning said slurry of fine basic calcium hypochlorite crystals to said mixing zone;
   (e) conveying said slurry of coarse basic calcium hypochlorite to a second separation means to separate coarse crystals of basic calcium hypochlorite from a calcium hypochlorite mother liquor; and
   (f) recovering said coarse crystals of basic calcium hypochlorite.

2. The process of claim 1 in which said basic calcium hypochlorite is selected from the groups consisting of dibasic calcium hypochlorite, hemibasic calcium hypochlorite and mixtures thereof.

3. The process of claim 2 in which said coarse crystals in said slurry of coarse crystals of basic calcium hypochlorite are in the range of from about 50 to about 1200 microns.

4. The process of claim 3 in which a portion of said slurry of coarse basic calcium hypochlorite crystals is mixed with said slurry of basic calcium hypochlorite crystals to form a dense slurry of basic calcium hypochlorite crystals and conveying said dense slurry of basic calcium hypochlorite crystals to said second separation means.

5. The process of claim 3 in which said slurry of basic calcium hypochlorite crystals is fed under pressure to said first separation means to separate by centrifugal force said slurry of basic calcium hypochlorite crystals into said slurry of fine basic calcium hypochlorite crystals and said slurry of coarse basic calcium hypochlorite crystals.

6. The process of claim 5 in which said basic calcium hypochlorite is dibasic calcium hypochlorite.

7. A process for producing calcium hypochlorite which comprises:
   (a) wetting lime with an aqueous slurry of fine basic calcium hypochlorite crystals in a first mixing zone to form an aqueous lime slurry;
   (b) reacting said aqueous lime slurry with a calcium hypochlorite solution in a crystallizing zone to produce a slurry of basic calcium hypochlorite crystals;
   (c) separating said slurry of basic calcium hypochlorite crystals in a first separation means into a slurry of fine basic calcium hypochlorite crystals and a slurry of coarse basic calcium hypochlorite crystals, said fine basic calcium hypochlorite crystals being less than about 50 microns in size;

(d) returning said slurry of fine basic calcium hypochlorite crystals to said first mixing zone;

(e) conveying said slurry of coarse basic calcium hypochlorite to a second separation means to separate coarse crystals of basic calcium hypochlorite from a calcium hypochlorite mother liquor;

(f) admixing said coarse crystals of basic calcium hypochlorite with lime and an alkali metal hypochlorite in a third mixing zone to form a mixed alkali slurry;

(g) reacting said mixed alkali slurry with chlorine to form a paste of calcium hypochlorite dihydrate;

(h) separating said paste into a cake of calcium hypochlorite dihydrate and a paste liquor;

(i) feeding said paste liquor to said crystallizing zone; and (j) drying said cake of calcium hypochlorite dihydrate to produce granular calcium hypochlorite.

8. The process of claim 7 in which said lime in said first mixing zone contains insoluble impurities.

9. The process of claim 7 in which insoluble impurities in said slurry of coarse basic calcium hypochlorite are removed prior to conveying said slurry of coarse basic calcium hypochlorite to said second separation means.

10. The process of claim 9 in which said basic calcium hypochlorite is selected from the groups consisting of dibasic calcium hypochlorite, hemibasic calcium hypochlorite, and mixtures thereof.

11. The process of claim 10 in which said coarse crystals in said slurry of coarse crystals of basic calcium hypochlorite are in the range of from about 50 to about 1200 microns.

12. The process of claim 11 in which a portion of said slurry of coarse basic calcium hypochlorite crystals is mixed with said slurry of basic calcium hypochlorite crystals to form a dense slurry of basic calcium hypochlorite crystals and conveying said dense slurry of basic calcium hypochlorite crystals to said second separation means.

13. The process of claim 12 in which said slurry of basic calcium hypochlorite crystals is fed under pressure to said first separation means to separate by centrifugal force said slurry of basic calcium hypochlorite crystals into said slurry of fine basic calcium hypochlorite crystals and said slurry of coarse basic calcium hypochlorite crystals.

14. The process of claim 13 in which said basic calcium hypochlorite is dibasic calcium hypochlorite.

15. The process of claim 2 in which said slurry of coarse basic hypochlorite crystals is fed to an elutriating zone and separated from a slurry of insoluble impurities.

16. The process of claim 15 in which said slurry of insoluble impurities are fed to an impurity separating zone and solid impurities removed from a filtrate.

17. The process of claim 16 in which said filtrate is conveyed to said elutriating zone.

* * * * *